United States Patent
McCague

(10) Patent No.: US 8,535,524 B2
(45) Date of Patent: Sep. 17, 2013

(54) EXCHANGEABLE MEDIA FILTER

(75) Inventor: Michael McCague, Escondido, CA (US)

(73) Assignee: Watkins Manufacturing Corporation, Vista, CA (US)

(*) Notice: Subject to any disclaimer, the term of this patent is extended or adjusted under 35 U.S.C. 154(b) by 446 days.

(21) Appl. No.: 12/879,967

(22) Filed: Sep. 10, 2010

(65) Prior Publication Data

US 2011/0062066 A1    Mar. 17, 2011

Related U.S. Application Data

(63) Continuation-in-part of application No. 12/762,632, filed on Apr. 19, 2010, now Pat. No. 8,366,922.

(60) Provisional application No. 61/242,749, filed on Sep. 15, 2009.

(51) Int. Cl.
  *E04H 4/12* (2006.01)
  *B01D 35/02* (2006.01)

(52) U.S. Cl.
  USPC .................... 210/167.11; 210/282; 4/507

(58) Field of Classification Search
  USPC ............ 210/167.1, 167.11, 167.12, 167.13, 210/282; 4/507
  See application file for complete search history.

(56) References Cited

U.S. PATENT DOCUMENTS

| | | | | |
|---|---|---|---|---|
| 3,335,917 A | * | 8/1967 | Knight | 222/189.07 |
| 3,822,787 A | * | 7/1974 | Shaltis et al. | 210/132 |
| 4,609,465 A | * | 9/1986 | Miller | 210/323.2 |
| 4,828,698 A | | 5/1989 | Jewel | |
| 4,954,251 A | * | 9/1990 | Barnes et al. | 210/806 |
| 5,190,161 A | * | 3/1993 | Arai | 209/400 |
| 5,411,661 A | * | 5/1995 | Heiligman | 210/264 |
| RE35,900 E | | 9/1998 | Meissner | |
| 6,099,729 A | | 8/2000 | Cella et al. | |
| 6,391,197 B1 | | 5/2002 | Billiet | |
| 6,395,167 B1 | * | 5/2002 | Mattson et al. | 210/167.12 |
| 6,627,074 B2 | | 9/2003 | Lincke | |
| 7,067,056 B2 | | 6/2006 | Collins | |
| 7,163,623 B2 | | 1/2007 | Knight | |
| 8,366,922 B2 | | 2/2013 | McCague | |
| 2003/0029813 A1 | * | 2/2003 | Gershenson | 210/767 |
| 2004/0025485 A1 | | 2/2004 | Lee | |
| 2004/0104163 A1 | | 6/2004 | Leaverton | |
| 2004/0168962 A1 | * | 9/2004 | Mattson et al. | 210/169 |

(Continued)

FOREIGN PATENT DOCUMENTS

CN   201908753 U   *   7/2011
EP     0269261 A1      1/1988

OTHER PUBLICATIONS

Form PCT/ISA/210 in connection with PCT/US2010/059515 dated Aug. 30, 2011.

(Continued)

*Primary Examiner* — Fred Prince
(74) *Attorney, Agent, or Firm* — Greenberg Traurig LLP; Franklin D. Ubell

(57) ABSTRACT

A filter element for a pool or spa including a sintered plastic outer cylinder of a first diameter, a sintered plastic inner cylinder of a second diameter less than said first diameter; the inner cylinder being position coaxially with respect to the outer cylinder to define an annular interior chamber; and a selected granulated filter medium or combination of media residing in the annular interior chamber.

6 Claims, 16 Drawing Sheets

(56) References Cited

U.S. PATENT DOCUMENTS

| | | |
|---|---|---|
| 2005/0067339 A1 | 3/2005 | McClure |
| 2005/0077224 A1* | 4/2005 | White et al. .................. 210/282 |
| 2005/0139535 A1 | 6/2005 | King |
| 2005/0161380 A1 | 7/2005 | Crawford |
| 2005/0199551 A1 | 9/2005 | Gordon |
| 2005/0263445 A1* | 12/2005 | Collins ........................ 210/169 |
| 2006/0027492 A1 | 2/2006 | Lin |
| 2006/0254972 A1* | 11/2006 | Tai et al. .................... 210/321.6 |
| 2007/0017877 A1 | 1/2007 | Musson |
| 2007/0289920 A1* | 12/2007 | Baker et al. .................. 210/505 |

OTHER PUBLICATIONS

Form PCT/ISA/237 in connection with PCT/US2010/059515 dated Aug. 30, 2011.
Form PCT/ISA/210 in connection with PCT/US2010/031945 dated Dec. 24, 2010.
Form PCT/ISA/237 in connection with PCT/US2010/031945 dated Dec. 24, 2010.

* cited by examiner

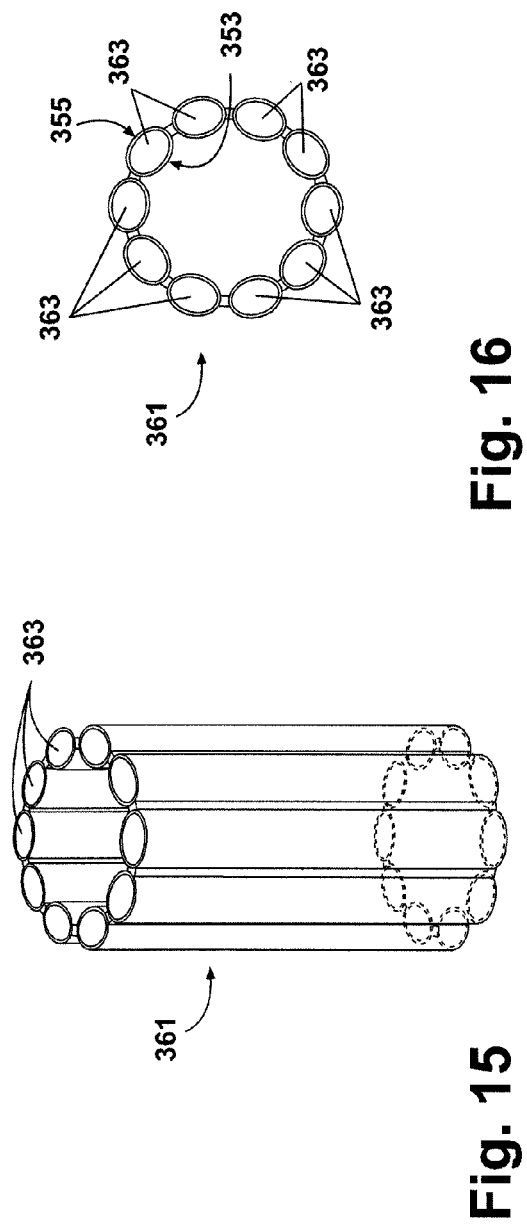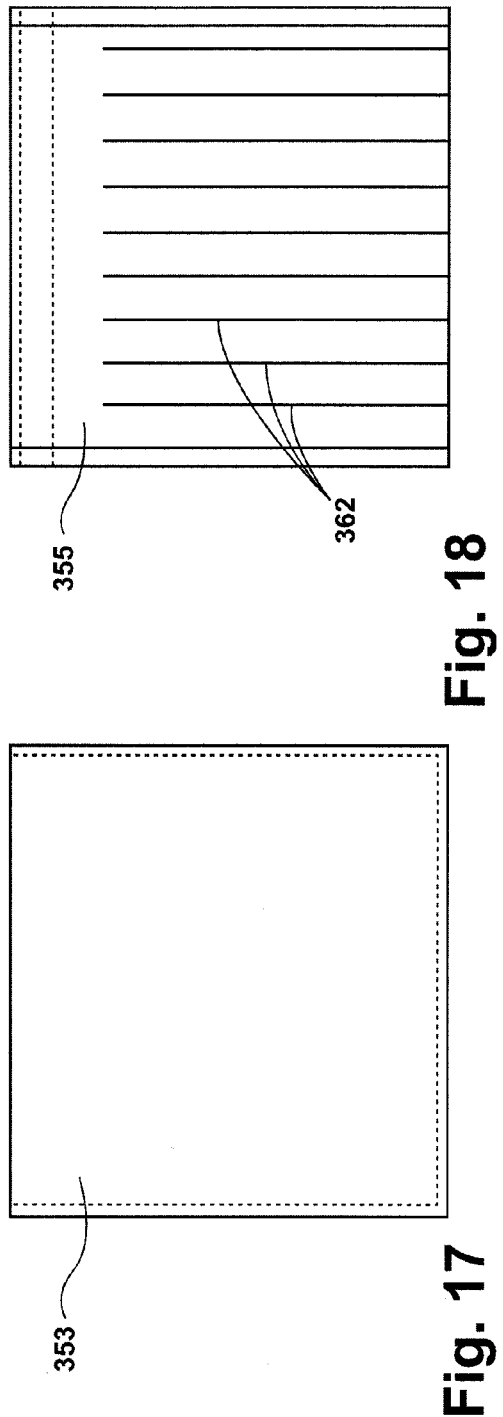
Fig. 16
Fig. 18
Fig. 15
Fig. 17

EXCHANGEABLE MEDIA FILTER

RELATED APPLICATIONS

This application is a continuation-in-part of U.S. patent application Ser. No. 12/762,632 filed Apr. 19, 2010 now U.S. Pat. No. 8,366,922, which claims priority to U.S. Provisional Patent application No. 61/242,749 filed Sep. 15, 2009, the contents of which are each hereby incorporated herein by reference in their entirety.

BACKGROUND OF THE INVENTION

1. Field of Invention

The subject disclosure relates to pools and spas and more particularly to improved methods and apparatus for filtering contaminants from pools and spas.

2. Description of Related Art

Portable spas have become quite popular as a result of their ease of use and multiplicity of features such as varied jet and seating configurations. One area where the inventor has recognized that ease of use could be enhanced is the area of maintaining proper water chemistry and sanitation.

SUMMARY

The following is a summary description of illustrative embodiments of the invention. It is provided as a preface to assist those skilled in the art to more rapidly assimilate the detailed design discussion which ensues and is not intended in any way to limit the scope of the claims which are appended hereto in order to particularly point tout the invention.

In an illustrative embodiment, water chemistry and sanitation are improved by installing a novel filter element in a filter compartment of a portable spa or tub In one embodiment, the filter element comprises a sintered plastic outer cylinder of a first diameter and a sintered plastic inner cylinder of a second diameter less than the first diameter. The inner cylinder is positioned coaxially with respect to the outer cylinder to define an annular interior chamber. A selected granular filter medium or media may then be placed in the annular chamber to combat one or more particular contaminants in the spa water.

In an alternative embodiment, a donut shaped bag containing selected filter media is placed in the annular chamber. In such an embodiment, the inner cylinder may be a suitable plastic mesh material and the bag may be adapted to hook over the inner cylinder.

BRIEF DESCRIPTION OF THE DRAWINGS

FIG. 15 is a perspective view of a baffled filter media bag embodiment;

FIG. 16 is a top view of the bag of FIG. 15;

FIG. 17 is a side view of an inner panel of the bag of FIG. 15; and

FIG. 18 is a side view of an outer panel of the bag of FIG. 15;

DETAILED DESCRIPTION

Figure 1:
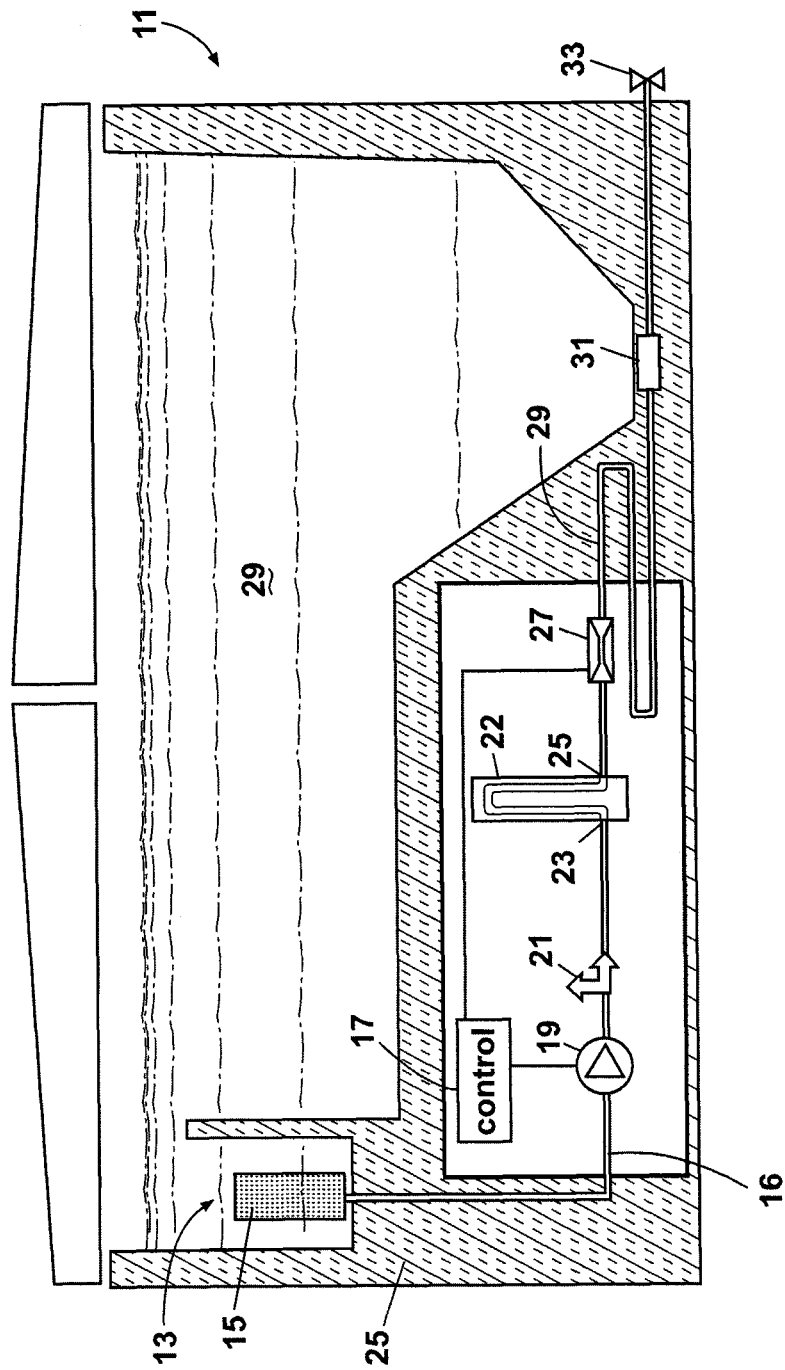
FIG. 1 is a schematic side sectional view of a portable spa.

FIG. 1 shows a first embodiment of a portable spa 11 containing an exchangeable media filter element 15. The spa 11 includes a water circulation, purification and heating system, which includes a filter compartment or "filter bucket" 13. In the system of FIG. 1, spa water 29 passes through a circulation pipe 16 to a circulation pump 19. A "T" junction 21 may be provided to supply water to a water feature such as a waterfall.

The circulation pump 19 further pumps the spa water through a "no fault" heater 22, with which are associated a regulating sensor 23 and a hi-limit sensor 25. An ozone generator and associated injector or other water purification apparatus 27 is also positioned in the return flow path to the spa 11, which may comprise an 8 to 10 foot contact chamber 29 and a spa inlet 31 where a circulation return jet is created. A secondary drain 33 may also be provided. An electronic control unit 17 controls the pump 19 and ozone generator 27, as well as other accessories which may be provided as part of the spa 11. In one embodiment, the filter bucket 13 may be a conventional filter bucket traditionally manufactured as part of the original spa equipment.

Figure 2:
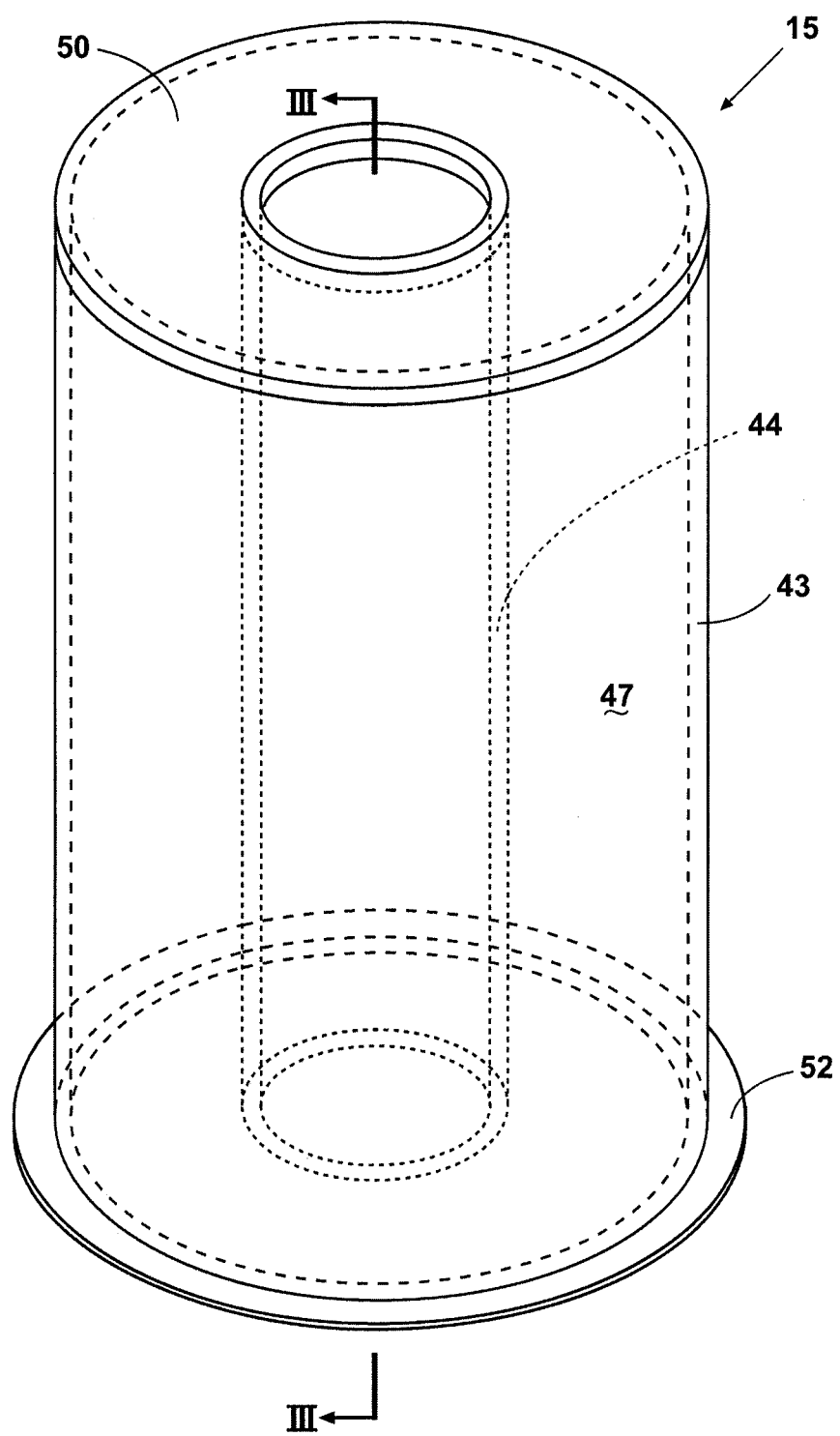
FIG. 2 is a perspective view of an exchangeable media filter according to an illustrative embodiment.
Figure 3:
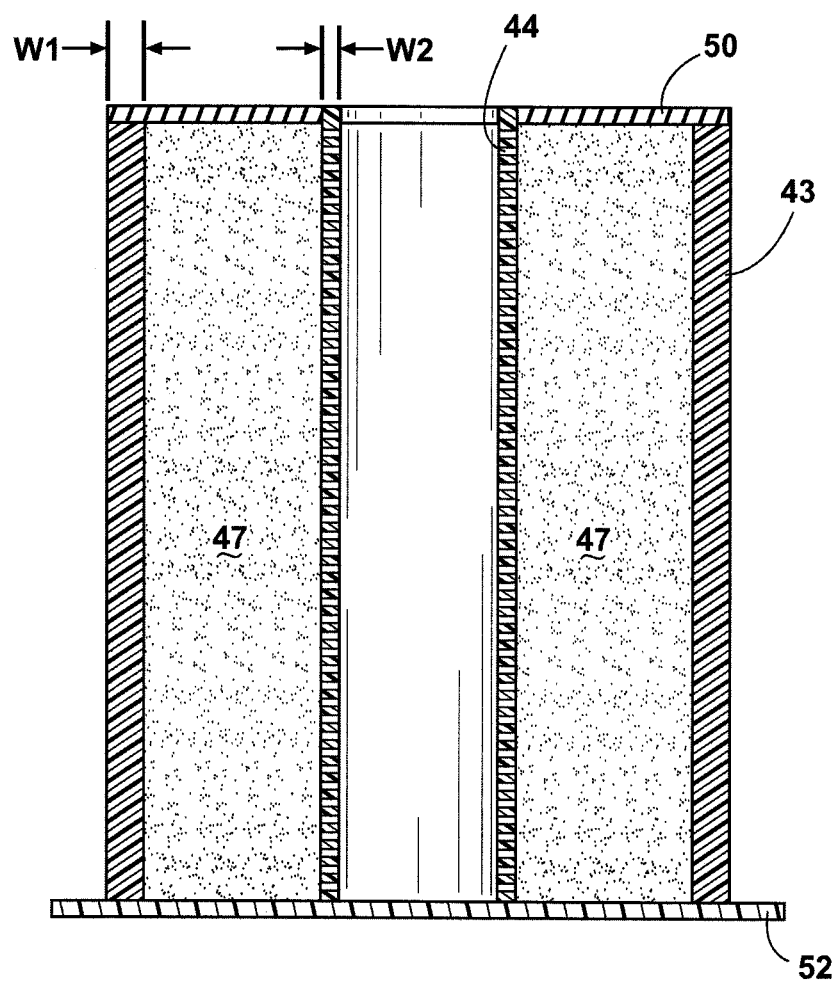
FIG. 3 is a side sectional view of the filter of FIG. 2 taken at 3-3 of FIG. 2.

An exchangeable media filter 15 according to an illustrative embodiment is shown in FIGS. 2 and 3. The filter 15 includes inner and outer co-axially mounted annular filter cylinders 43, 44 with a top cap 50 and a bottom cap 52. The cylinders 43, 44 are formed of sintered plastic, such as, for example, polypropylene or polyethylene. Other materials for the cylinders 43, 44 may include, for example, and without limitation, PTFE (poly tetrafluoroethylene), PVDF (poly vinylidene fluoride), EVA (ethyl vinyl acetate) Nylon, thermoplastic polyurethane. The top and bottom caps 50, 52 may be formed, for example, of plastisol, polyurethane, PVC, ABS, or Noryl, polypro, polyethylene, or chemically/thermally set plastic resin elastomer.

Presently preferred thicknesses $W_1$, $W_2$ for each of the cylinders range from 1/16" to 1/2" with an exemplary thickness of 1/8" for both $W_1$ and $W_2$. Porosity of the cylinders may range from 25 to 150 microns, with 100 microns being a typical porosity. While the filter 15 is cylindrical, other geometrical shapes, such as square or star-shaped could be employed. Various heights and outer diameters may also be employed, including diameters of conventional filter elements such as, for example, 8 to 20 inches tall and 5 to 12 inches in outer diameter.

The respective filter elements 43, 44 define an annular hollow inner chamber 47. The annular chamber 47 constitutes a space which is filled with a selected granulated or beaded medium or combination of granulated or beaded media. Such media may include, for example, and without limitation:

Ion exchange resin
De-ionization resin
Zeolite
Activated carbon
Silver based media
Ceramic
Solid sanitizer (chlorine/bromine)

After filling the chamber 47, the top cap 50 is fixed in place to close the unit. In operation, water flows radially from the outside larger diameter cylinder 43 to the inner cylinder 44, at a flow rate of e.g. 1-10 gallons per minute, thus bringing the water in contact with the active media. An advantage of the illustrative embodiment is that cylinders containing different filter media can be added or exchanged after the spa has been filled with water in response to occurrence of a problem with a particular type of contaminant.

In use, when a spa is filled with water, there is an amount of contamination already in the water. Through usage, chemical addition, evaporation, and water addition; waste and other toxic elements can build up in the water. Traditionally, it is recommended to change the water when the total dissolved solids (TDS) exceed 1500 ppm, or based on a days of use measure; for example, according to the formula [(Spa size in gallons)/3] (times) (number of bathers per day)=the number of days before water change is needed.

A filter constructed according to the illustrative embodiments serves to extend the life of the water, reduce the number of water changes and save water by removing the accumulated TDS from the water. Such TDS include: toxic metals such as lead, iron, copper, manganese, minerals, calcium, magnesium, sodium, chloride, soaps, detergents, foaming agents, oils, suntan lotions, cyanuric acid, ammonia, pesticides, pharmaceuticals, organic acids, beer/wine, components of human sweat and waste, chlorinated by-products, humic acid, urine, body fluids, and tannins.

Figure 4:
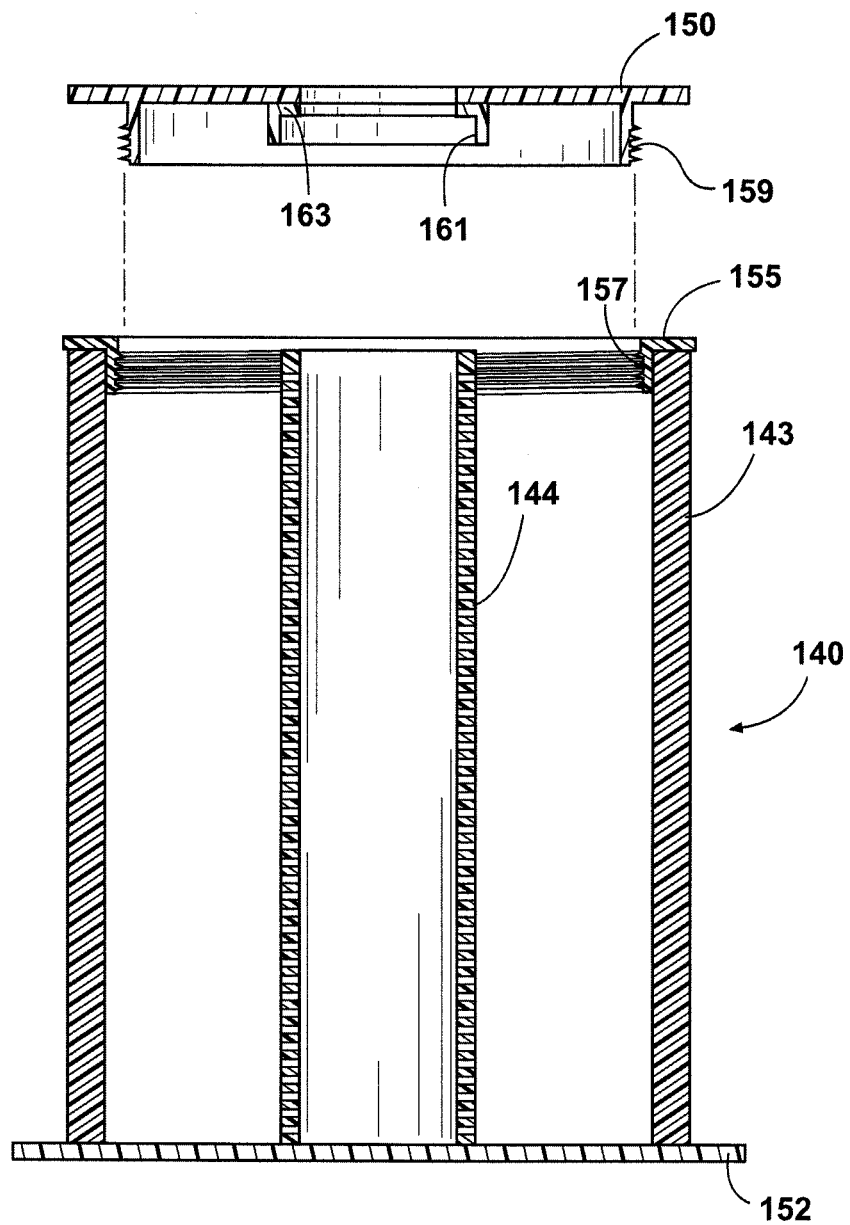
FIG. 4 is a side sectional view of an alternate embodiment.

In an alternative embodiment, a screw-on cap is provided on a filter like that of FIG. 1, enabling a user to change the media. In such case, the filter is removed from the spa, the top is unscrewed, and the media is replaced. In some embodiments the media may be limited to consumer friendly media like carbon, resin beads, and zeolites. As illustrated in FIG. 4, such an embodiment may comprise two cylinders 143, 144 with a potted bottom cap 152. A ring 155 with internal threads 157 is provided, which is seated and bonded to the top of the outer cylinder 143. The top cap 150 has external threads 159, which permits the top cap 150 to be screwed onto the top of the filter 140 until an internal sealing surface 161 on an inner ring 163 of the top cap 150 contacts and seals with the inner cylinder 144.

Figure 5:
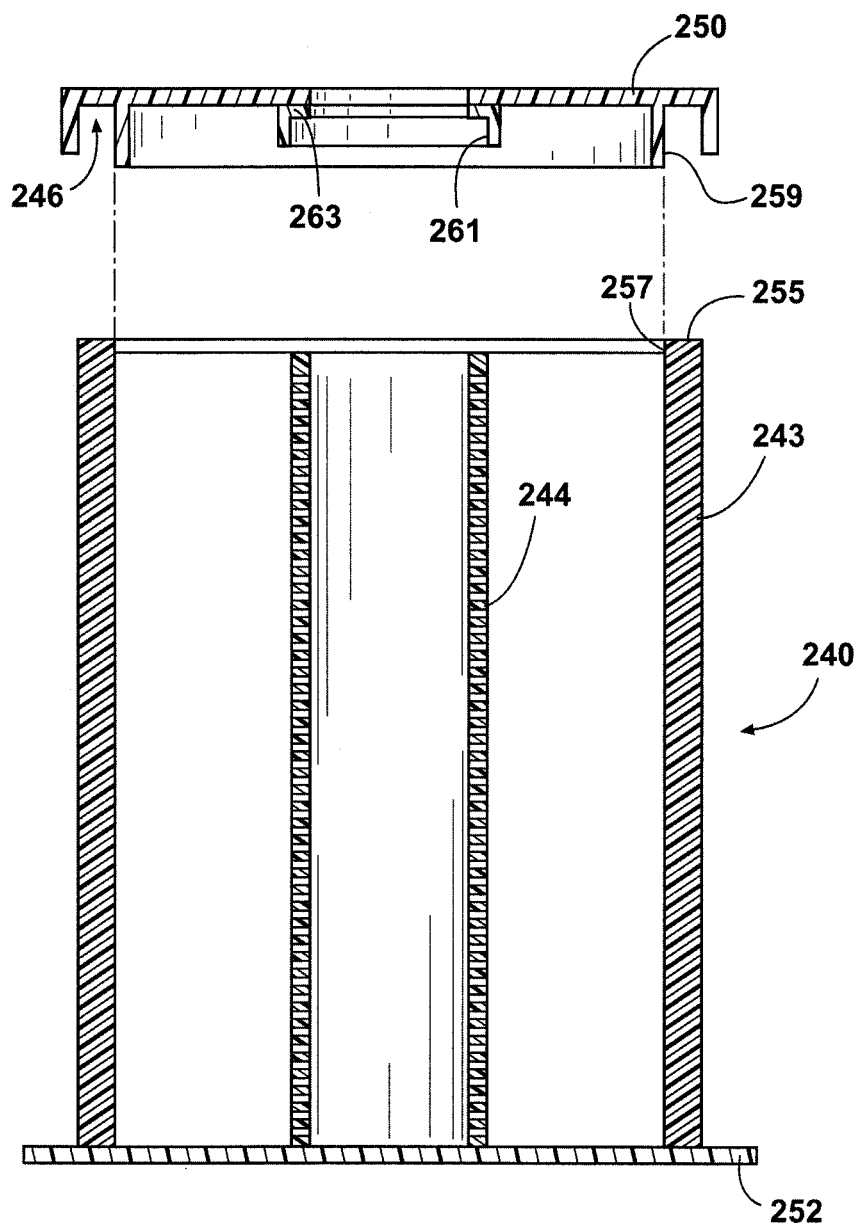
FIG. 5 is a side sectional view of an alternate embodiment.

In an alternative embodiment, a press-fit or friction fit, rather than screw-on, cap is provided on a filter like that of FIG. 2. As illustrated in FIG. 5, such an embodiment may comprise two cylinders 243, 244 with a potted bottom cap 252. The top cap 250 has a grooved surface 259, defining a groove 246, which is dimensioned to press fittingly engage surface 243. The internal sealing surface 261 on an inner ring 263 of the top cap 250 may also contact and press-fittingly seal with the inner cylinder 244.

Figure 6:
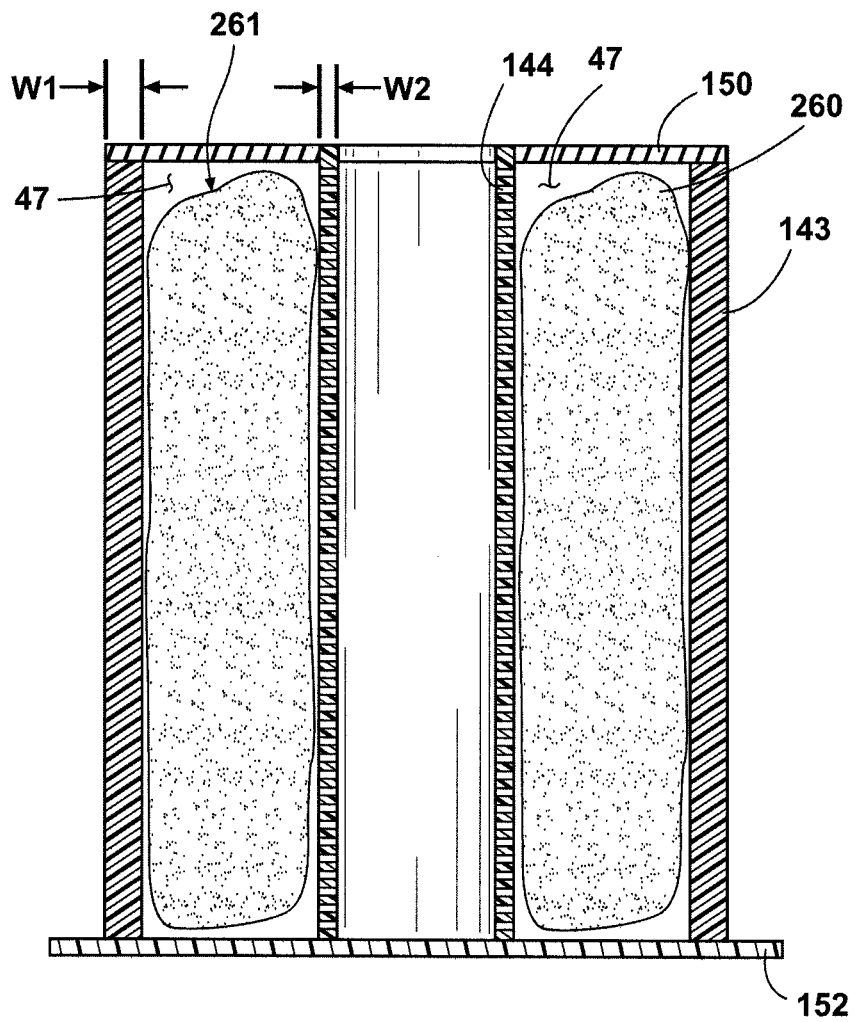
FIG. 6 is a side sectional view of an embodiment employing a resin filled bag.

FIG. 6 illustrates an embodiment wherein the filter media 260 is contained within a donut-shaped or annular cross-sectioned bag 261 formed of a suitable water permeable, porous material. Such material may comprise, for example, polypropylene, polyester, cotton, rayon, polyethylene, nylon, PTFE (Teflon), polyacrylonitrile, or acrylic. In various embodiments, the fabric type may be woven, nonwoven, felt, or mesh of a thickness of, for example, 0.01"-0.25". Illustrative porosities range from 10 microns to 500 microns.

Figure 7:
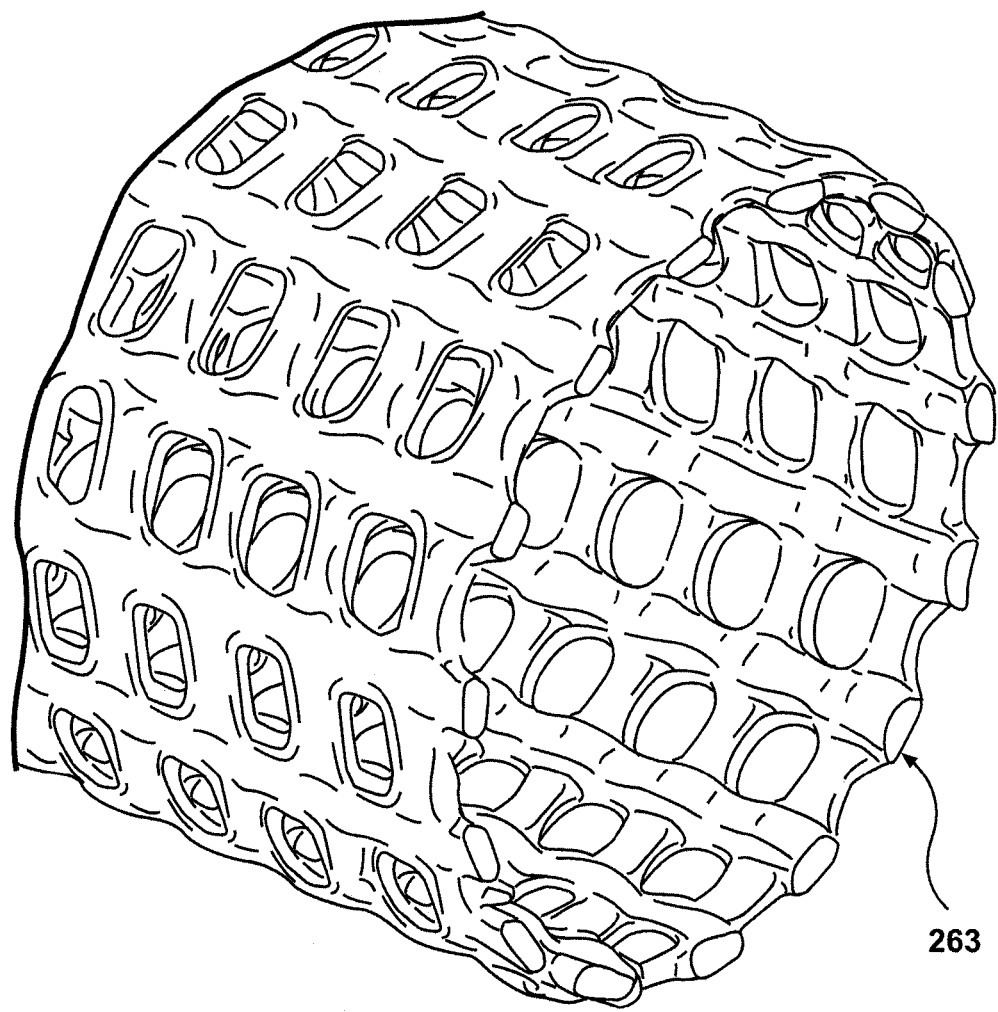
FIG. 7 is a perspective view illustrating a mesh structure forming an inner cylinder in one embodiment.
Figure 8:
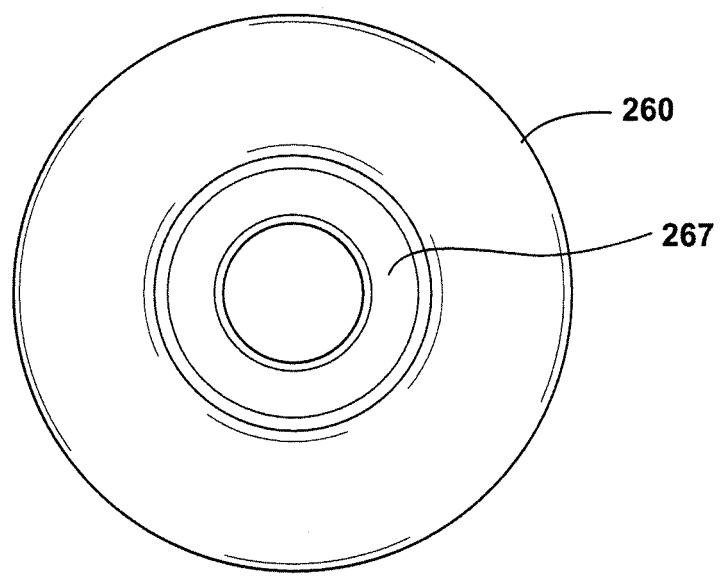
FIG. 8 is a top view of a resin filled bag with a top hook feature.
Figure 9:
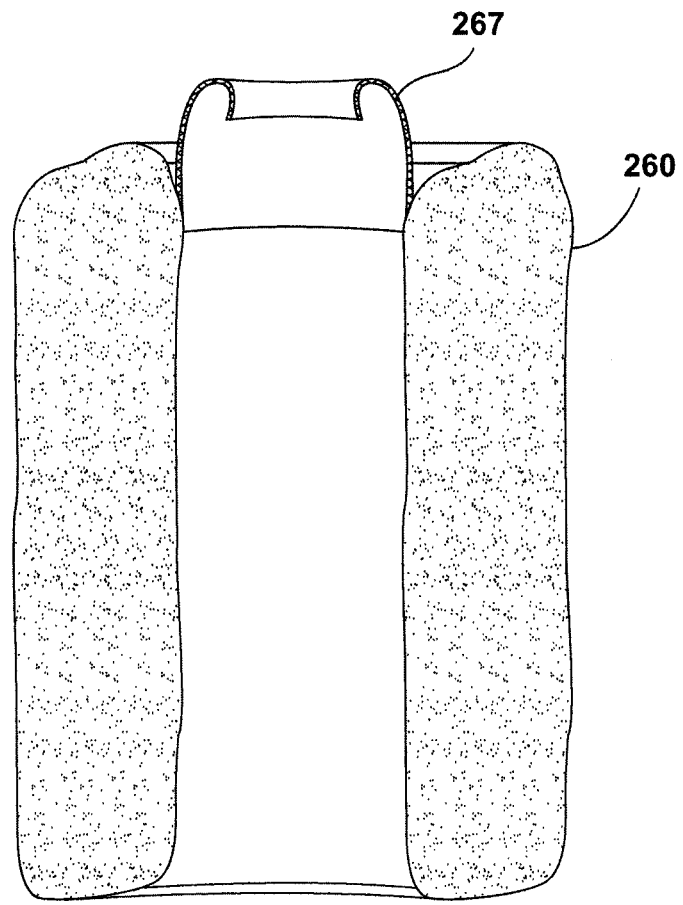
FIG. 9 is a side sectional view of the bag of FIG. 8.
Figure 10:
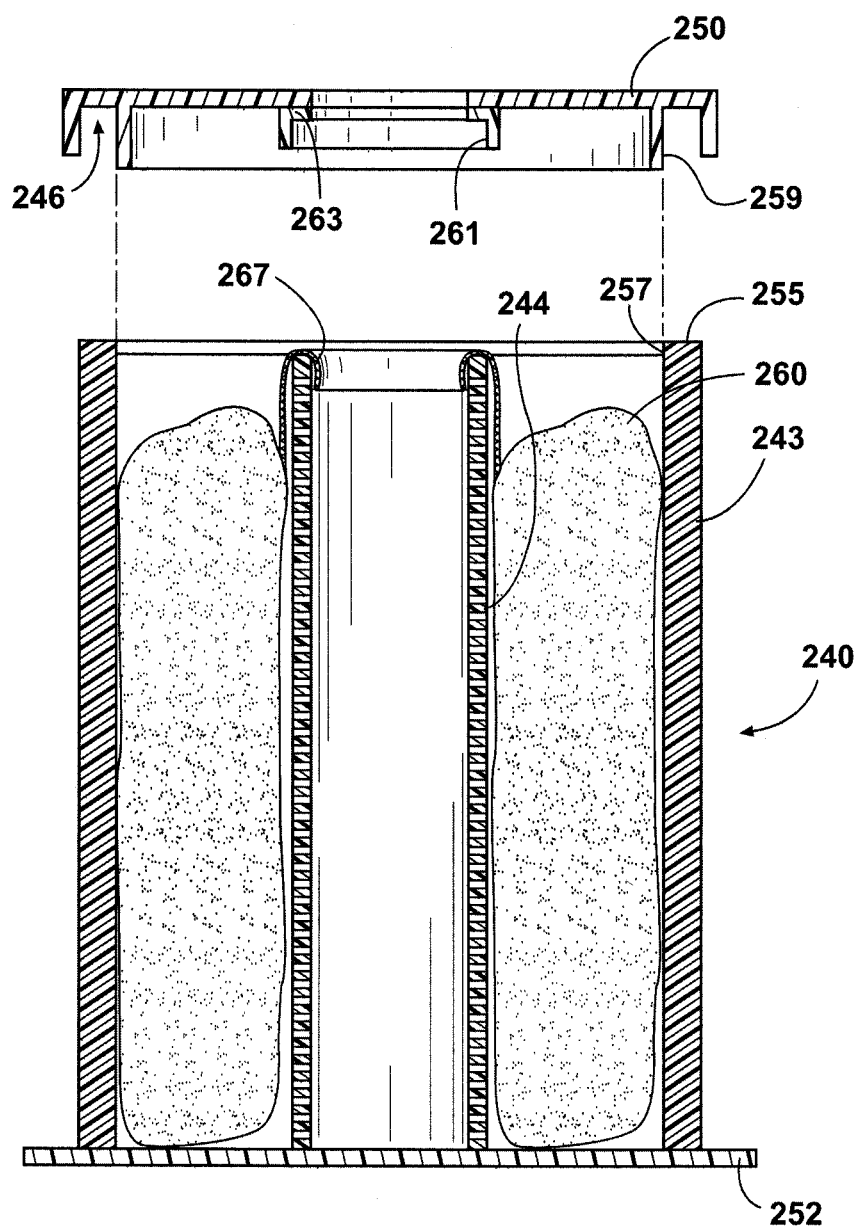
FIG. 10 is a side sectional view of a media filter embodiment employing the bag of FIGS. 8 and 9.
Figure 11:
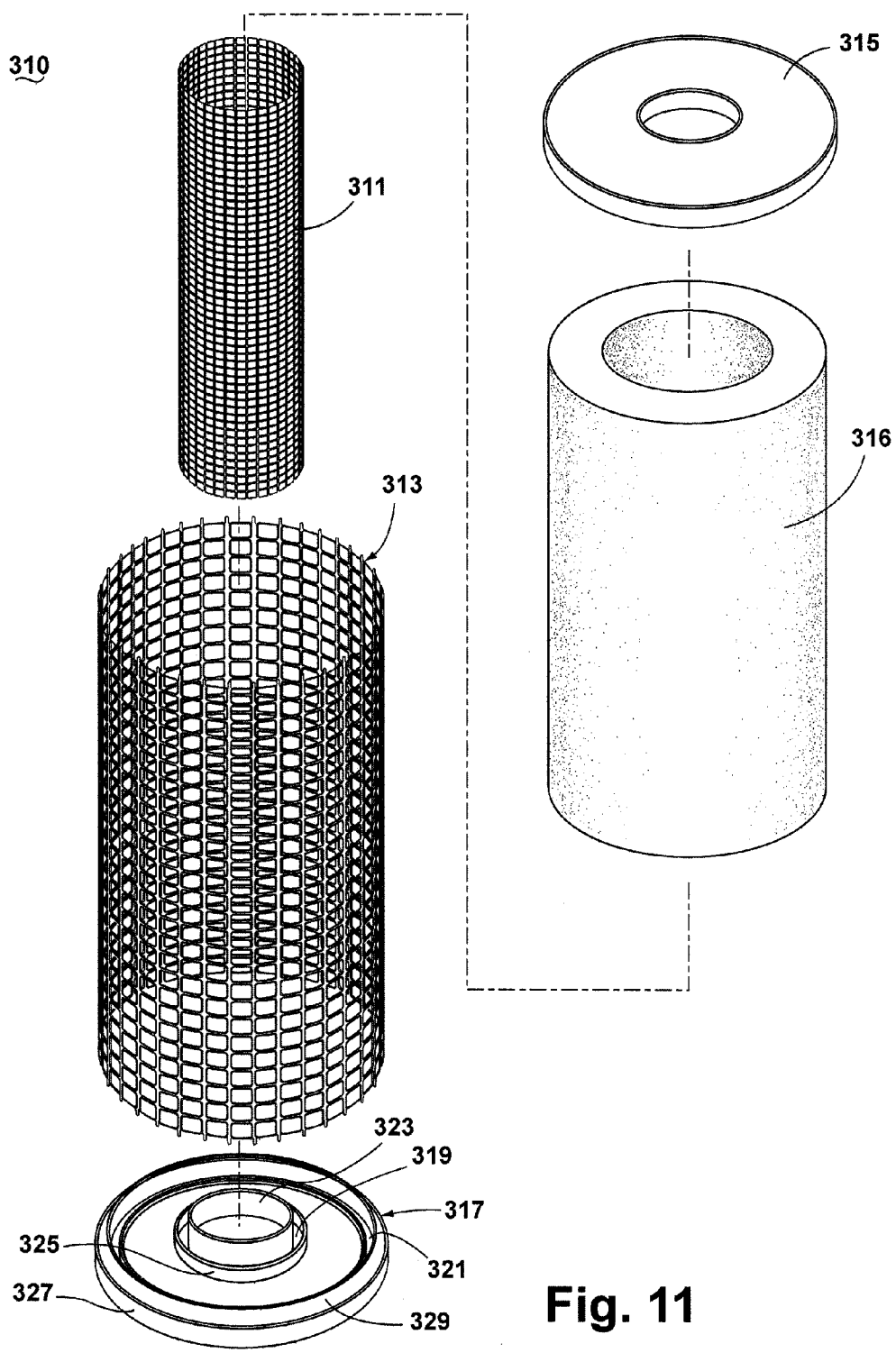
FIG. 11 is an exploded perspective view of another media filter embodiment.
Figure 12:
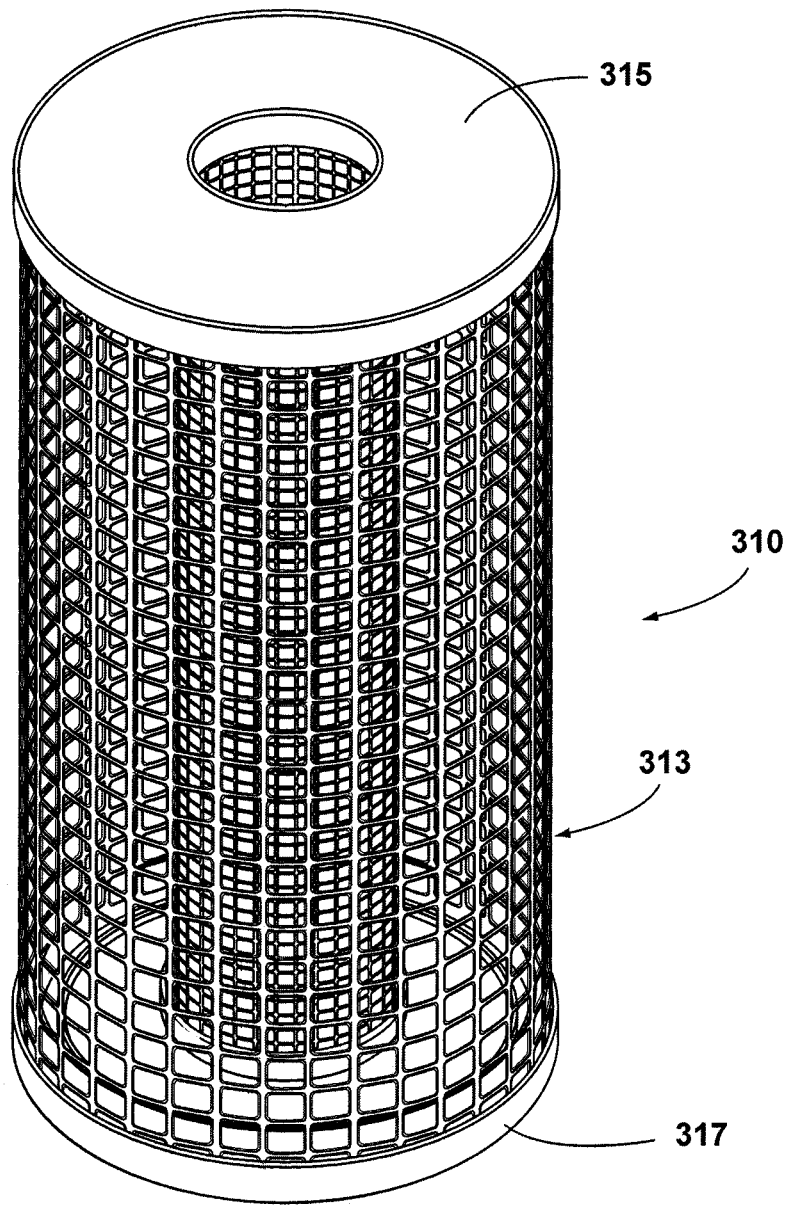
FIG. 12 is a perspective view of the filter of FIG. 11 in an assembled state without media present between the mesh cylinders of the filter.
Figure 13:
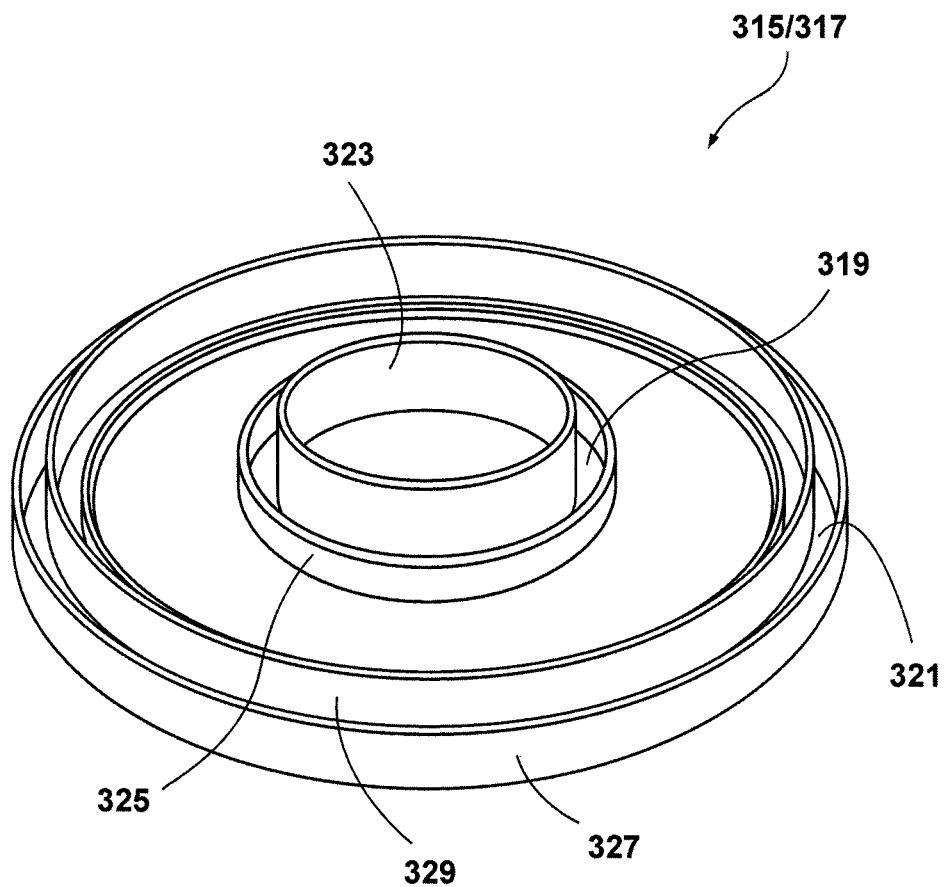
FIG. 13 is a perspective view of an end cap of the embodiment of FIG. 11.
Figure 14:
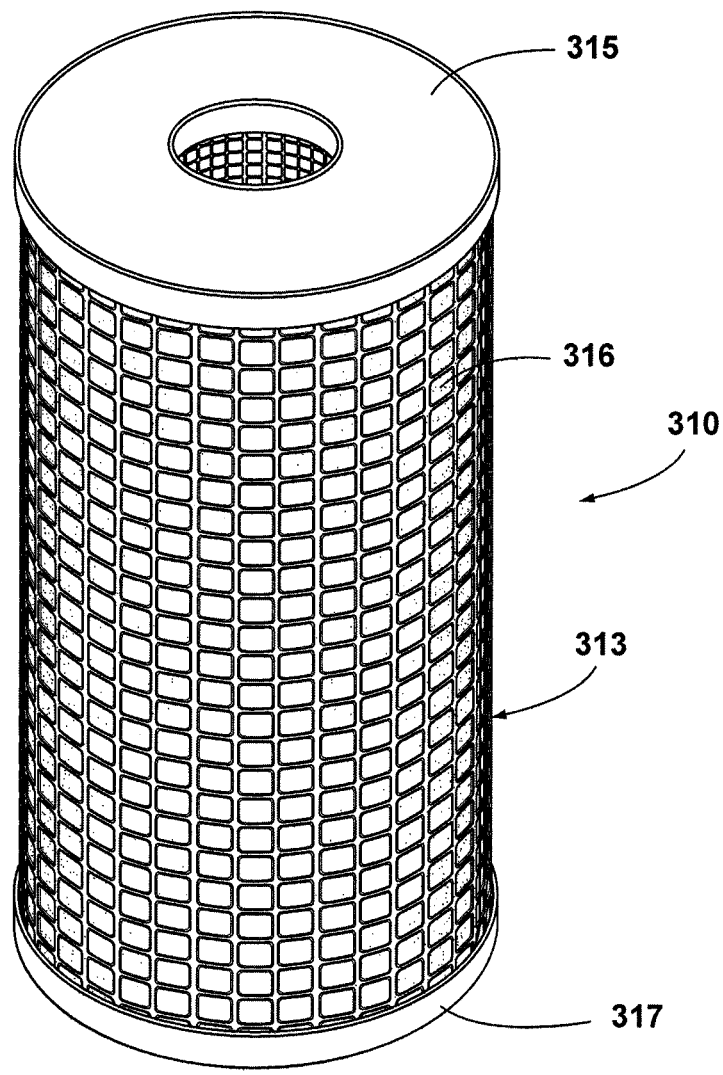
FIG. 14 is a perspective view of the filter of FIG. 1 in an assembled state.

In an embodiment such as FIG. 6, the inner cylinder 144 may comprise a plastic net/mesh material 263 as shown in FIG. 7, such as, for example, part No. 2370 as manufactured by Industrial Netting, Minneapolis, Minn. Additionally, in one embodiment, shown in FIGS. 8 and 9, the donut bag 261 may have a fabric flange, flap, or hook 267 formed as a part thereof or attached thereto for purposes of slipping over the top rim or edge of an inner filter core. Thereafter, a top cap can be installed to hold the bag 260 in place, as illustrated in FIG. 10. In one embodiment, an inner core or cylinder 244 of reduced height may be employed to accommodate the thickness of the fabric hook 267.

In another embodiment of a filter 310 illustrated in FIGS. 11-14, both an inner cylinder 311 and an outer cylinder 313 may comprise a plastic net or mesh material such as Part No. 2370 as manufactured by Industrial Netting, Minneapolis, Minn. In general the plastic mesh or net may comprise expanded or extruded plastic heated or ultra welded to form a rigid to semi-rigid mesh network. In various embodiments, the mesh network comprises openings of a uniform shape and size, for example, square, diamond, or rectangular. In one specific embodiment, the openings are square and 0.150 inches on a side.

Exemplary diameters for the inner and outer cylinders 311, 312 may be 1½ to 3 inches and 5 to 10 inches respectively with 2½ inches and 6 inches being the dimensions of an exemplary embodiment. Such dimensions of course may vary in various embodiments. In one embodiment, the inner cylinder 311 may be extruded as a single seamless tube, whereas the outer cylinder 312 is extruded as a flat sheet and is then rolled and sealed along a vertical edge.

The filter of FIGS. 11-14 further includes a top cap 315 and a bottom cap 317, which may be identical components in one embodiment. The caps 315, 317 each include an inner circular channel 319 of rectangular cross-section and an outer circular channel 321 of rectangular cross-section, each of a width of, for example, 0.1 to 0.2 inches. The cylinders 311, 313 are preferably potted into the bottom cap 317, while the top cap 315 press-fits or friction-fits into place. In other embodiments, the cylinders 311, 313 could be glued or snap fitted or otherwise attached to the end caps.

The inner circular channel 319 of the caps 315, 317 is formed of two concentric cylinders 323, 325 with the inner cylinder 323 having a height greater than the outer cylinder 325 in order to assist with alignment of parts during assembly. Similarly, the outer channel 321 is defined between concentric cylinders 327, 329 where the inner cylinder 329 has a greater height for same purpose. The end caps 315, 317 may be molded or otherwise fabricated of a suitable plastic such as, for example, ABS, PVC, acetyl, Delrin, polypropylene, polyethylene, polyurethane and/or plastisol.

Figure 19:
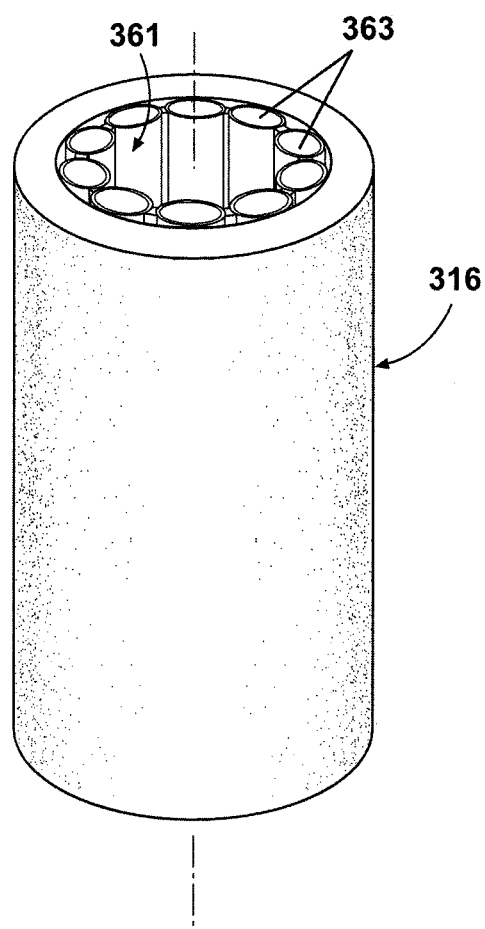
FIG. 19 is a perspective view of a baffled filter media structure disposed within a spun bonded depth filter.

Various filter media may be placed within the annular cavity defined between the inner and outer cylinders 311, 313. One such medium may be a spun bonded depth filter 316. Such a filter may be formed, for example, of polyethylene, polypropylene, or nylon, and may be resin coated and sized to fit in between the inner and outer cylinder 311, 313. In other embodiments, porous bags of various suitable media described above may be formed as illustrated generally in FIGS. 6, 9 and 10 and inserted into the annular cavity. In some embodiments, a spun bonded element such as element 316 and a porous filter media bag may both be used at the same time to achieve advantageous results. In one embodiment, a cylindrical spun bonded filter element may be positioned concentrically with a porous bag 351, as shown in FIG. 19.

The alternative fabric bag 351 is illustrated in detail in FIGS. 15-17. The bag 351 includes inner and outer rectangular fabric components 353, 355, which are suitably sewn together to form a baffled structure 361, which includes a plurality of vertical compartments 363 arranged in a circle. The bottom of each compartment 363 is first sewn shut, and each compartment 363 is then filled with a suitable medium or combination of media and thereafter sewn shut. In one embodiment, vertical stitching along lines 362 (FIG. 18,) is used to form the baffled compartments 363. In other embodiments, the bag may be formed by ultra sonic or heat welding. FIG. 19 shows the baffled filter bag structure 361 disposed within a spun bonded depth filter 316.

Suitable fabric materials for the bag may be the same as those for bag 261 of FIG. 6. Suitable media for the bag may comprise silver media beads of various compositions, as well as various other media listed or discussed above.

Figure 20:
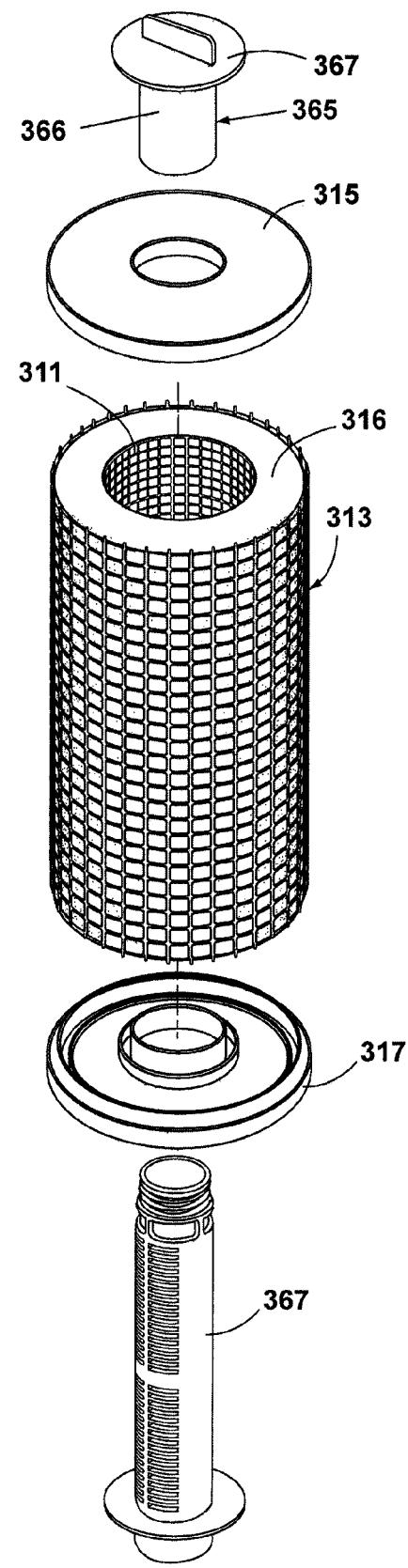
FIG. 20 is an exploded perspective view of an embodiment wherein an inner filter fits down and around a conventional filter stand pipe.

Various embodiments of the filters according to FIGS. 11-18 are designed such that the inner cylinder 311 fits down and around a conventional filter stand pipe having a threaded top end such that a threaded cap or plug may be attached to the end of the stand pipe to hold the filter element 310 and its top cap 315 in place. One such embodiment is shown in FIG. 20 where the cylindrical or portion 366 of a cap 365 plugs through the central opening of top cap 315. The interior of the cylinder 366 has threads which mate with those at the top end of a stand pipe 367 allowing the cap 365 to be screwed onto the stand pipe 367. As the cap 365 is screwed down onto the stand pipe the circular flange portion 367 of the cap comes into flush abutment against the top cap 315 thereby further securing it in position. These and other mesh embodiments provide an easy-to-use filter wherein the filter elements can be easily removed for cleaning or replacement.

Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:
1. Apparatus comprising:
a portable spa or tub;
a filter compartment in said spa or tub;
a filter element positioned in said filter compartment, the filter element comprising:
a plastic mesh outer cylinder of a first diameter;
a plastic mesh inner cylinder of a second diameter less than said first diameter; the inner cylinder being positioned coaxially with respect to the outer cylinder, the inner and outer cylinders being spaced apart so as to define an annular interior chamber between an outer surface of the inner cylinder and an inner surface of the outer cylinder;
a selected filter medium or combination of selected filter media residing in said annular chamber; and
wherein said filter medium or filter media comprises a porous baffled bag containing a selected granular or beaded filter medium or combination of selected granular and/or beaded filter media, said bag residing in said annular chamber.

2. The apparatus of claim 1 wherein said filter medium or filter media further comprises a spun bonded filter medium.

3. The apparatus of claim 2 wherein said porous baffled bag and said spun bonded filter medium are disposed concentrically with respect to one another.

4. The apparatus of claim 3 wherein said outer and inner cylinders each comprise a plastic mesh having square openings 0.150 inches on a side.

5. The apparatus of claim 1 wherein said filter medium or filter media comprises beads comprising a silver composition.

6. The apparatus of claim 1 wherein said outer and inner cylinders each comprise a plastic mesh having square openings 0.150 inches on a side.

* * * * *